United States Patent
Suzuki et al.

(10) Patent No.: US 10,994,591 B2
(45) Date of Patent: May 4, 2021

(54) AUTOMOTIVE EXTERIOR PANEL

(71) Applicant: NIPPON STEEL & SUMITOMO METAL CORPORATION, Tokyo (JP)

(72) Inventors: Toshiya Suzuki, Tokyo (JP); Yoshiaki Nakazawa, Tokyo (JP); Yasuhiro Ito, Tokyo (JP); Satoshi Shirakami, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 107 days.

(21) Appl. No.: 16/320,948

(22) PCT Filed: Jul. 26, 2017

(86) PCT No.: PCT/JP2017/027079
§ 371 (c)(1),
(2) Date: Jan. 25, 2019

(87) PCT Pub. No.: WO2018/021421
PCT Pub. Date: Feb. 1, 2018

(65) Prior Publication Data
US 2019/0168588 A1 Jun. 6, 2019

(30) Foreign Application Priority Data

Jul. 28, 2016 (JP) .............................. JP2016-148793

(51) Int. Cl.
*B60J 5/04* (2006.01)
(52) U.S. Cl.
CPC .............. *B60J 5/0425* (2013.01); *B60J 5/043* (2013.01); *B60J 5/0415* (2013.01); *B60J 5/0429* (2013.01); *B60J 5/0441* (2013.01); *B60J 5/0447* (2013.01)

(58) Field of Classification Search
CPC ...... B60J 5/0425; B60J 5/0447; B60J 5/0441; B60J 5/0415; B60J 5/0429; B60J 5/043
See application file for complete search history.

(56) References Cited

U.S. PATENT DOCUMENTS

| 2005/0225115 A1 | 10/2005 | Wallström et al. |
| 2012/0056445 A1 | 3/2012 | Golovashchenko |

FOREIGN PATENT DOCUMENTS

| CN | 202345774 U | 7/2012 |
| EP | 1364821 A1 | 11/2003 |

(Continued)

OTHER PUBLICATIONS

International Search Report for PCT/JP2017/027079 dated Sep. 5, 2017.

(Continued)

*Primary Examiner* — D Glenn Dayoan
*Assistant Examiner* — Melissa Ann Bonifazi
(74) *Attorney, Agent, or Firm* — Birch, Stewart, Kolasch & Birch, LLP

(57) ABSTRACT

Provided is a configuration that makes up for a lack of tensile rigidity and a lack of collision properties at the same time. [Solution] An automotive exterior panel according to the present invention: an exterior material 110; and a reinforcing member 120 that is in contact along an automobile inside surface of the exterior material 110 and of which a second moment of area in a direction orthogonal to the exterior material is less than or equal to 15,000 mm4 in a cross section orthogonal to a longitudinal direction of the 10 reinforcing member. By this configuration, the second moment of area in a direction orthogonal to the longitudinal direction of the reinforcing member 120 is made less than or equal to 15,000 mm4, and hence a lack of tensile rigidity can be made up for at the same time.

15 Claims, 20 Drawing Sheets

(56) References Cited

FOREIGN PATENT DOCUMENTS

| EP | 1674313 A2 | 6/2006 |
|---|---|---|
| JP | 57-178925 A | 11/1982 |
| JP | 6-171362 A | 6/1994 |
| JP | 7-89345 A | 4/1995 |
| JP | 2005-500933 A | 1/2005 |
| JP | 2009-154580 A | 7/2009 |
| JP | 2011-251624 A | 12/2011 |
| JP | 2015-113053 A | 6/2015 |
| KR | 20-1998-029298 U | 8/1998 |

OTHER PUBLICATIONS

Office Action for TW 106125486 dated May 21, 2018.
Written Opinion of the International Searching Authority for PCT/JP2017/027079 (PCT/ISA/237) dated Sep. 5, 2017.
English translation of International Preliminary Report on Patentability and Written Opinion dated Feb. 7, 2019, in PCT/JP2017/027079 (Forms PCT/IB/326, PCT/IB/373, and PCT/ISA/237).
Extended European Search Report for counterpart European Application No. 17834423.0, dated Jul. 11, 2019.
Japanese Office Action, dated Jan. 7, 2020, for Japanese Application No. 2018-530362, with an English translation.

AUTOMOTIVE EXTERIOR PANEL

TECHNICAL FIELD

The present invention relates to an automotive exterior panel.

BACKGROUND ART

Thus far, Patent Literature 1 below has described a technology that assumes the provision of a reinforcing member of an outer sheet of an automotive body that can achieve a weight reduction of the component itself and has a high effect of improvement in the surface rigidity of the outer sheet of the car body, for example.

CITATION LIST

Patent Literature

Patent Literature 1: JP 2011-251624A

SUMMARY OF INVENTION

Technical Problem

These days, an exterior material used for an automotive exterior panel or the like tends to be reduced in wall thickness in response to requests of weight reduction etc.; however, the reduction in wall thickness causes a problem that tensile rigidity is reduced. Consequently, there is a problem that, when a door panel or the like is pushed by a hand, the exterior material deforms easily, for example.

A more detailed description is as follows: for tensile rigidity in a conventional exterior panel, necessary properties have been satisfied by using the sheet thickness, the shape (regarding curvature etc.), and character lines of the exterior material, and the installation of a conventional reinforcing component in a part with the weakest tensile rigidity (for example, the center of the panel). On the other hand, if a reduction in the wall thickness of an exterior material for the purpose of weight reduction is made, such measures other than the sheet thickness by themselves have difficulty in making up for a lack of tensile rigidity.

In this regard, there is a technology that attempts to improve a conventional reinforcing component from the viewpoint of improvement in tensile rigidity, like in Patent Literature 1 above, for example; however, if the degree of wall thickness reduction is increased like, for example, a wall thickness reduction from 0.7 mm to less than or equal to 0.5 mm in terms of the original thickness of the exterior material, there is a problem that, if it is attempted to make up for a lack of tensile rigidity by the entire exterior panel of the object, the number of necessary reinforcing components is increased, and the weight reduction effect is reduced to some extent. Further, the increase in the number of necessary reinforcing components may lead to even a weight increase on the contrary.

As above, it is difficult for the structure of a conventional exterior panel to make up for a lack of tensile rigidity when the exterior material is reduced in wall thickness and at the same time to obtain a weight reduction effect, which is an original object of the wall thickness reduction of the exterior material.

Thus, the present invention has been made in view of the problem mentioned above, and an object of the present invention is to provide an automotive exterior panel capable of making up for a lack of tensile rigidity.

Solution to Problem

To solve the problem described above, according to an aspect of the present invention, there is provided an automotive exterior panel including: an exterior material; and a reinforcing member that is in contact along an automobile inside surface of the exterior material and of which a second moment of area in a direction orthogonal to the exterior material is less than or equal to 15,000 mm$^4$ in a cross section orthogonal to a longitudinal direction of the reinforcing member.

A yield stress of the reinforcing member may be more than or equal to 500 MPa.

In addition, a cross portion may be provided in the reinforcing member, and the second moment of area in the direction orthogonal to the exterior material may be less than or equal to 15,000 mm$^4$ in the cross section orthogonal to the longitudinal direction of the reinforcing member extending from the cross portion.

In addition, two or more cross portions may be provided.

In addition, the reinforcing member may be stuck to the exterior material in a region of more than or equal to ⅓ of a total length of the reinforcing member.

In addition, the exterior material may have a concave curved portion that is curved concavely as viewed from an outside of an automobile, and the reinforcing member overlapping with the concave curved portion may be stuck to the exterior material.

In addition, the reinforcing member may go across the exterior material.

In addition, the reinforcing member may be joined to the exterior material.

In addition, the reinforcing member may pass through an inside of a circle in which, among three line segments obtained by trisecting a longest line segment among line segments each connecting any two points on an outline of the exterior material, a line segment located in a center is taken as a diameter.

In addition, a plurality of the reinforcing members may be arranged between a first side and a second side of the exterior material that face each other, at least one of the reinforcing members may be placed more on a side of the first side than an intermediate line between the first side and the second side, at least one of the reinforcing members may be placed more on a side of the second side than the intermediate line, an extending direction of each of the reinforcing members may be a direction along a nearer one of the first side and the second side, and a first distance between adjacent two of the reinforcing members may be shorter than a second distance from the first side or the second side to a nearest one of the reinforcing members.

In addition, an angle between the reinforcing member and one side near to the reinforcing member out of the first side and the second side may be within 30°.

In addition, the first distance may be a distance between two points at which adjacent two of the reinforcing members and a line segment connecting a midpoint of the first side and a midpoint of the second side cross.

In addition, the second distance may be a distance between the midpoint of the first side and a point at which the reinforcing member nearest to the first side and the line segment connecting the midpoint of the first side and the midpoint of the second side cross.

In addition, the second distance may be a distance between the midpoint of the second side and a point at which the reinforcing member nearest to the second side and the line segment connecting the midpoint of the first side and the midpoint of the second side cross.

Advantageous Effects of Invention

As described above, according to the present invention, a lack of tensile rigidity can be made up for.

DESCRIPTION OF EMBODIMENTS

Figure 1:
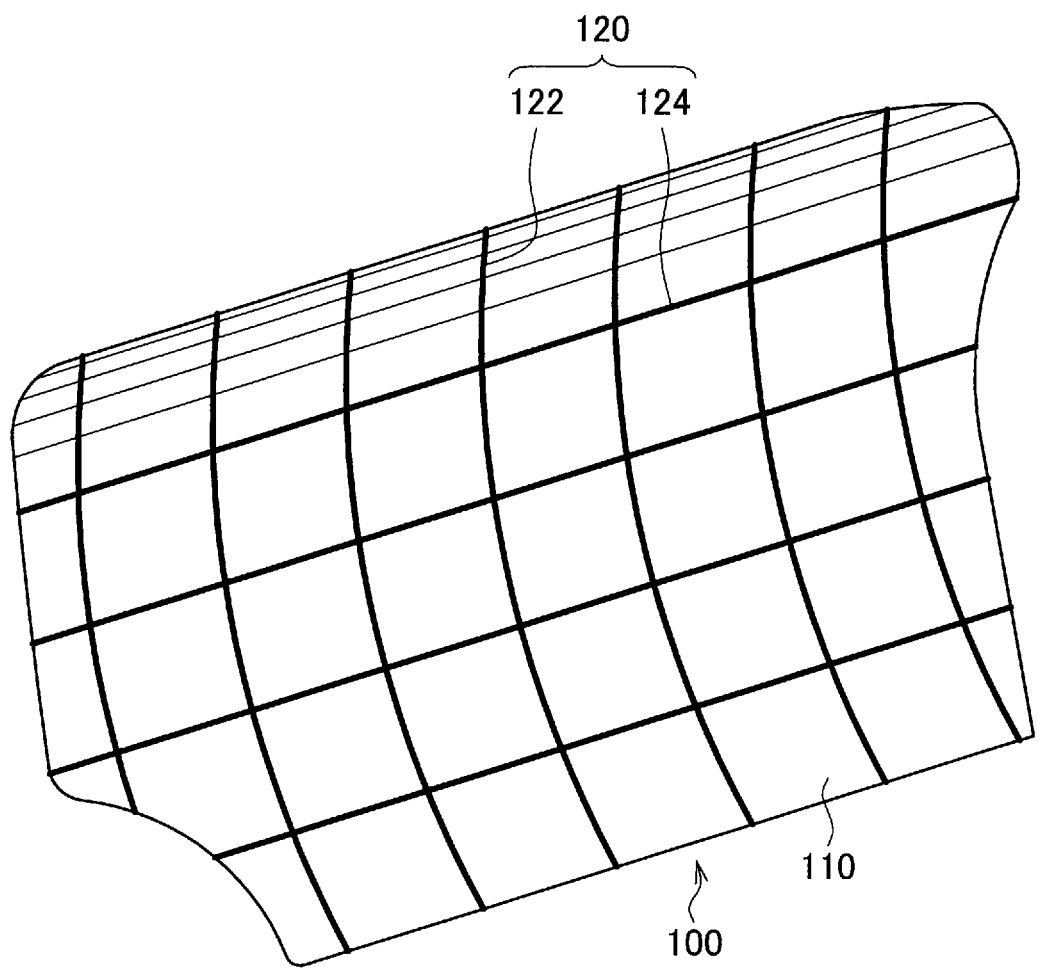
FIG. 1 is a schematic diagram showing a state where an automotive exterior panel according to the present embodiment is viewed from a back side.

Hereinafter, (a) preferred embodiment(s) of the present invention will be described in detail with reference to the appended drawings. Note that, in this specification and the appended drawings, structural elements that have substantially the same function and structure are denoted with the same reference numerals, and repeated explanation of these structural elements is omitted.

First, a configuration of an automotive exterior panel according to an embodiment of the present invention is described with reference to FIG. 1. FIG. 1 is a schematic diagram showing a state where an automotive exterior panel 100 according to the present embodiment is viewed from the back side (the inside of the automobile). Herein, a door panel is shown as an example of the exterior panel 100, but the exterior panel 100 may be a panel of another part of the automobile, such as a fender, a hood, or a roof.

As shown in FIG. 1, the exterior panel 100 is composed of an exterior material 110 and reinforcing members 120. The exterior material 110 is formed of a steel sheet with a thickness of approximately 0.4 mm, as an example. The exterior material 110 is curved such that the front side forms a convex surface. The curvature of the curve runs along the vehicle height direction of the automobile (the up and down direction).

The reinforcing members 120 include first reinforcing members 122 arranged in the up and down direction and second reinforcing members 124 arranged in the vehicle length direction of the automobile (the horizontal direction). The first reinforcing member 122 is curved to follow the curvature of the exterior material 110. The second reinforcing member 124 extends almost in a straight line; however, in the case where the exterior material 110 is curved, the second reinforcing member 124 has a shape following the curve. Both the first reinforcing member 122 and the second reinforcing member 124 are stuck to the exterior material 110, and are preferably joined (adhered) to the exterior material 110.

Figure 2:
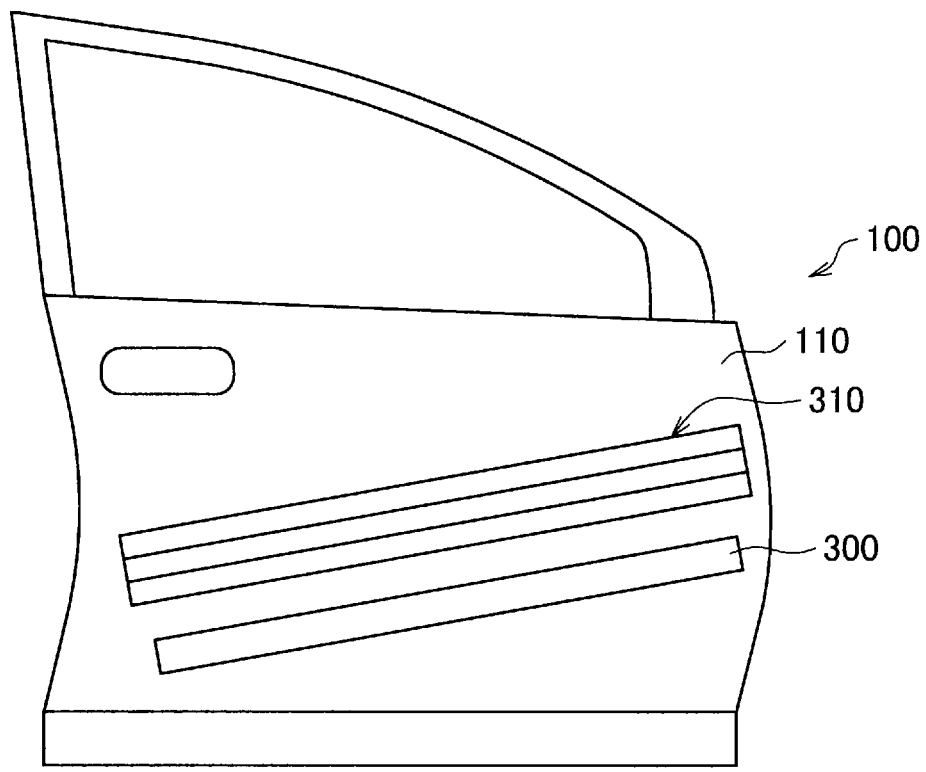
FIG. 2 is a schematic diagram showing a conventional structure for comparison, and is a schematic diagram showing a configuration in which a door impact bar and a reinforce are arranged on an inside of an exterior material.
Figure 3:
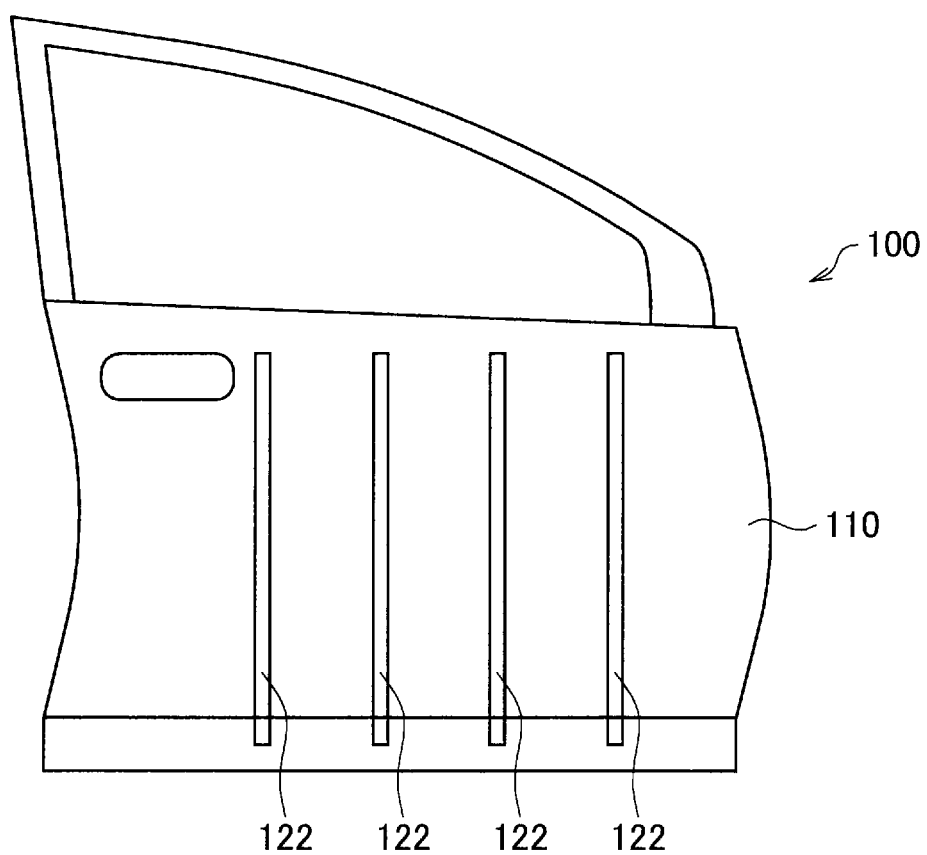
FIG. 3 is a schematic diagram showing a variation of an arrangement of reinforcing members.

FIG. 2 is a schematic diagram showing a conventional structure for comparison. In FIG. 2, a door impact bar 300 and a reinforce 310 are arranged on the inside of the exterior material 110. FIG. 3 to FIG. 7 are diagrams showing, as the exterior panel 100, automotive door panels according to the present embodiment. FIG. 3 to FIG. 7 are schematic diagrams showing variations of the arrangement of reinforcing members 120. The example shown in FIG. 3 shows an example in which only first reinforcing members 122 arranged in the up and down direction are provided in the exterior panel 100.

Figure 4:
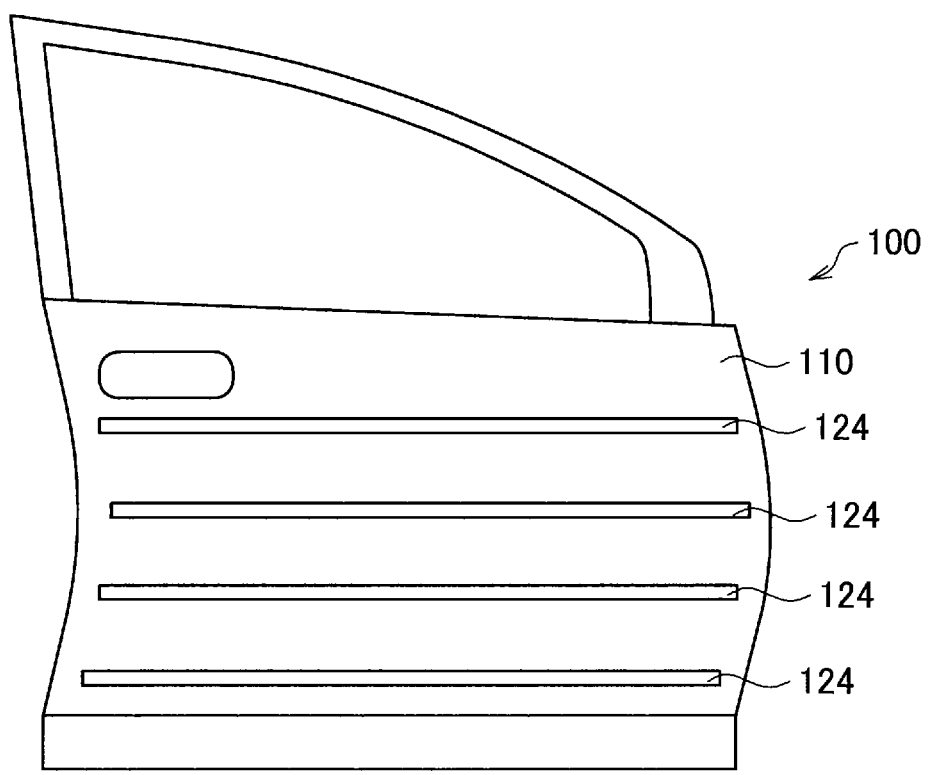
FIG. 4 is a schematic diagram showing a variation of an arrangement of reinforcing members.
Figure 5:
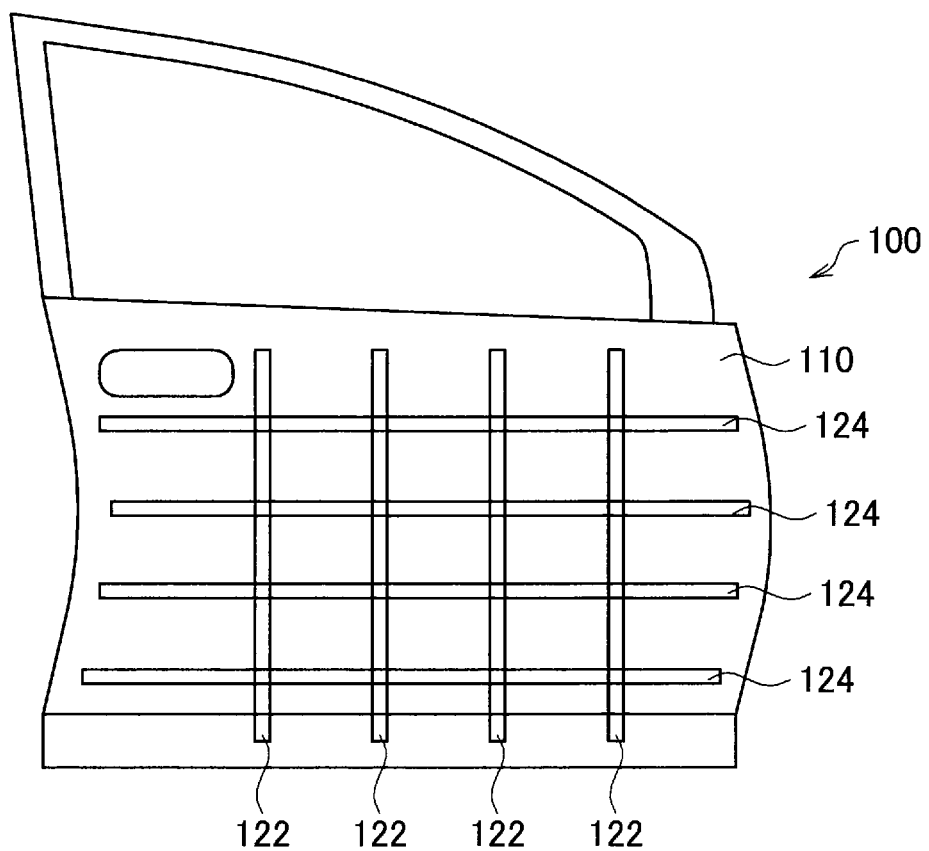
FIG. 5 is a schematic diagram showing a variation of an arrangement of reinforcing members.
Figure 6:
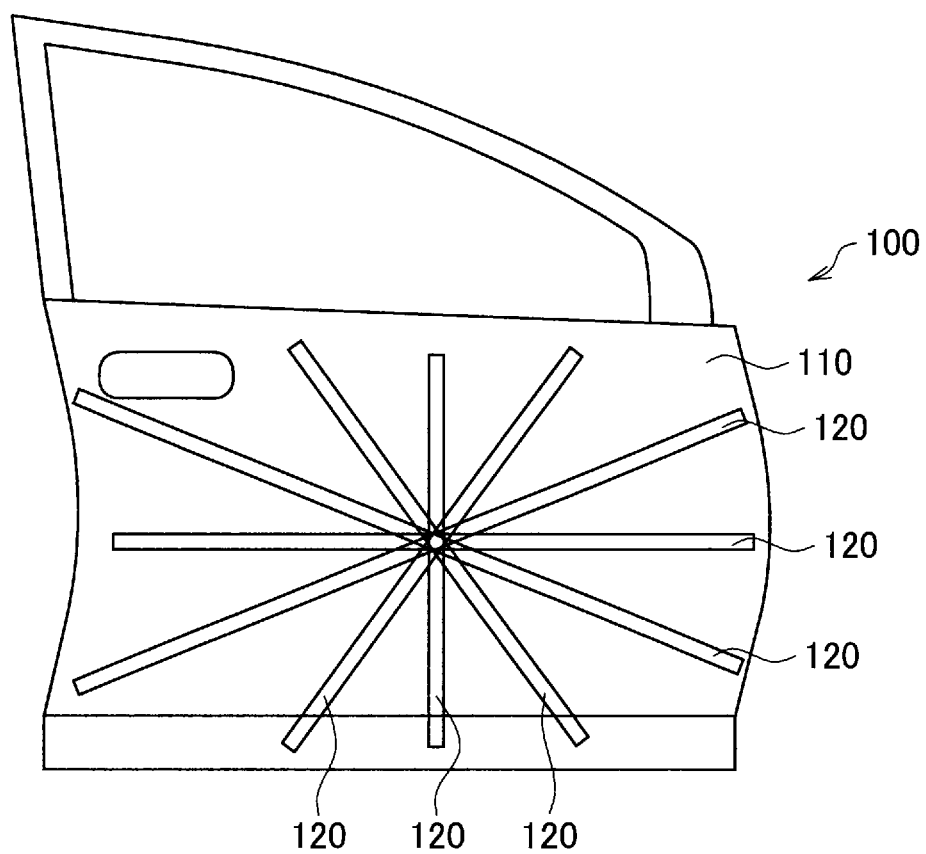
FIG. 6 is a schematic diagram showing a variation of an arrangement of reinforcing members.
Figure 7:
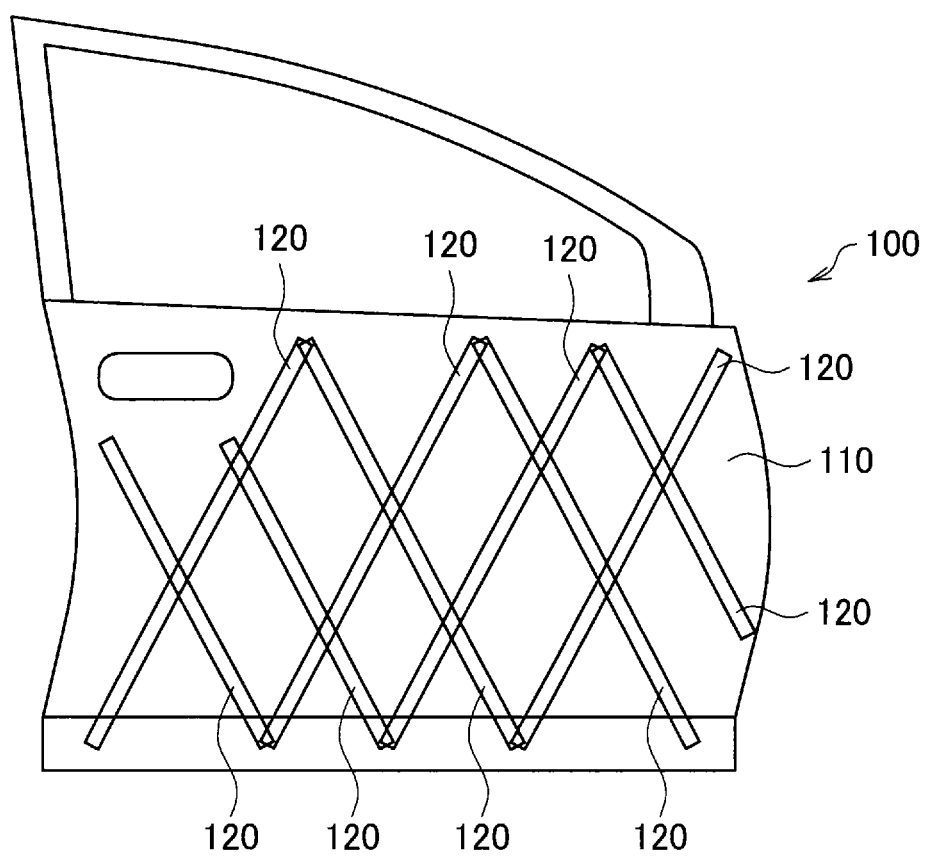
FIG. 7 is a schematic diagram showing a variation of an arrangement of reinforcing members.

Further, the example shown in FIG. 4 shows an example in which only second reinforcing members 124 arranged in the front and rear direction are provided in the exterior panel 100. The example shown in FIG. 5 shows an example in which first reinforcing members 122 arranged in the up and down direction and second reinforcing members 124 arranged in the front and rear direction are provided in the exterior panel 100. The example shown in FIG. 6 shows an example in which reinforcing members 120 are arranged radially in the exterior panel 100. The example shown in FIG. 7 shows an example in which reinforcing members 120 are arranged to cross obliquely in the exterior panel 100.

Figure 8:
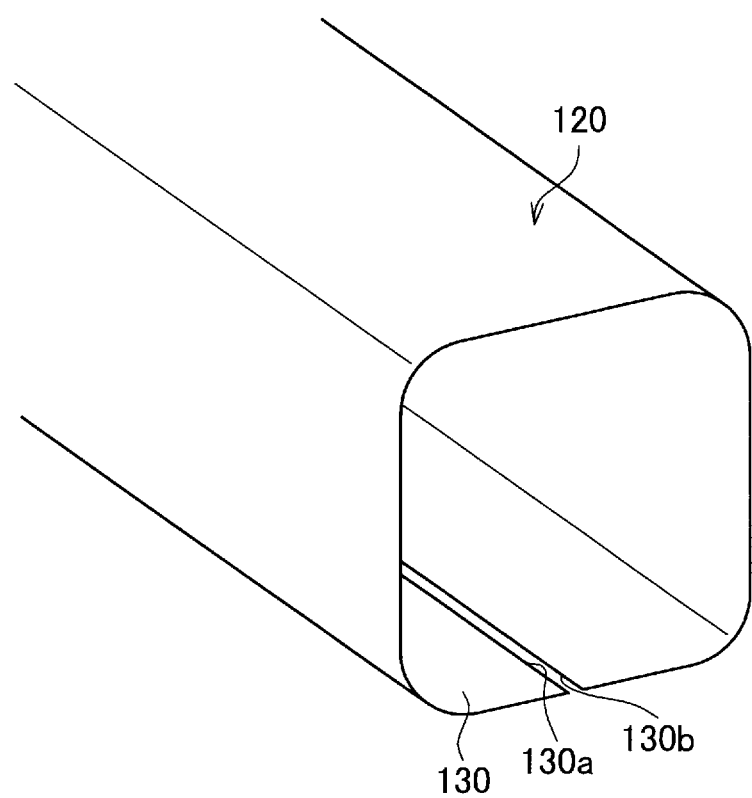
FIG. 8 is a perspective view showing a configuration of a reinforcing member.

FIG. 8 is a perspective view showing a configuration of the reinforcing member 120. The basic configurations of the first reinforcing member 122 and the second reinforcing member 124 may be the same. FIG. 8 shows also a cross-sectional configuration orthogonal to the longitudinal direction of the reinforcing member 120. The reinforcing member 120 has a rectangular cross section. The reinforcing member 120 is produced by bending a sheet material 130. In the example shown in FIG. 8, the reinforcing member 120 has a cross-sectional shape of a square, with one side of approximately 6 mm to 10 mm. The sheet thickness of the sheet material 130 forming the reinforcing member 120 is approximately 0.8 mm, as an example. A steel sheet may be used as the sheet material 130.

As shown in FIG. 8, a prescribed gap is provided between end 130*a* and end 130*b* of the bent sheet material 130. On the other hand, end 130*a* and end 130*b* may be stuck together. Further, end 130*a* and end 130*b* may be joined together by welding, adhesion, or the like. The reinforcing member 120 is preferably placed such that the surface on the opposite side to the surface on which ends 130*a* and 130*b* are located is stuck to the exterior material 110. Thereby, when the reinforcing member 120 is curved by being pushed from the outside of the exterior panel 100 in the configuration in which ends 130*a* and 130*b* are not joined together, an event in which the cross section opens from ends 130*a* and 130*b* and the cross-sectional shape collapses can be prevented; thus, the rigidity of the exterior panel 100 can be enhanced more. When being joined together, the reinforcing member 120 and the exterior material 110 may also be arranged such that the surface on which ends 130*a* and 130*b* of the reinforcing member 120 are located is joined to the exterior material 110. This is because an event in which the cross section opens from ends 130*a* and 130*b* and the cross-sectional shape collapses can be prevented by joining ends 130*a* and 130*b* to the exterior material 110. The cross-sectional configuration of the reinforcing member 120 is not limited to a configuration of a closed cross section like that of FIG. 8, and may be a gutter-like (channel) shape with a cross section in which the surface on the opposite side to the exterior material 110 is opened, or the hat shape shown in FIG. 20, for example.

As above, in the present embodiment, the first and second reinforcing members 122 and 124 are in contact with the exterior material 110. Thereby, the area of each of the regions surrounded by the first and second reinforcing members 122 and 124 and the outline of the exterior material 110 is smaller than the area of the entire exterior material 110; therefore, it is likely that tension will occur earlier when external force acts on the exterior material 110, and hence the tensile rigidity of the exterior material 110 can be enhanced. It is more preferable that the exterior material 110 and the reinforcing member 120 be joined together; thus, when the exterior material 110 deforms, tension occurs still earlier in the exterior material 110 in a region between adjacent reinforcing members 120, and tensile rigidity can be improved even more.

In the reinforcing member 120, the second moment of area in a direction orthogonal to the longitudinal direction is set to less than or equal to 15,000 mm$^4$, and is preferably set to less than or equal to 12,000 mm$^4$. The material quality, the sheet thickness, and the cross-sectional shape of the sheet material 130 of the reinforcing member 120 are set so as to satisfy this condition, as appropriate. By satisfying this condition, the reinforcing member 120 is allowed to have a small cross-sectional shape; thus, even when a plurality of first and second reinforcing members 122 and 124 are arranged in order to enhance tensile rigidity, a large weight increase is not caused, and tensile rigidity can be improved efficiently. When the second moment of area in a direction orthogonal to the longitudinal direction of the reinforcing member 120 is smaller, the cross-sectional shape can be smaller, and the weight per reinforcing member 120 can be lighter; hence, the flexibility of the number and arrangement of reinforcing members 120 for tensile rigidity improvement is improved, and tensile rigidity can be improved more efficiently; however, in view of fabrication ability at the time of fixing the reinforcing member 120 to the exterior panel 100, the second moment of area mentioned above may be set to more than or equal to 10 mm$^4$.

The yield stress of the reinforcing member 120 is set to more than or equal to 500 MPa. Thereby, even when external force acts on the reinforcing member 120, the occurrence of plastic deformation can be prevented; thus, tensile rigidity can be ensured effectively, and a weight reduction can be achieved.

A certain length or more of the reinforcing member 120 is placed along the exterior material 110. Specifically, the reinforcing member 120 is stuck to the exterior material 110 in a region of more than or equal to ⅓ of the total length of the reinforcing member 120. By placing the reinforcing member 120 such that it is stuck to the exterior material 110, the tensile rigidity of the exterior panel 100 can be improved even when the degree of wall thickness reduction of the exterior material 110 is increased (for example, a wall thickness reduction from 0.7 mm to less than or equal to 0.5 mm in terms of the original thickness). The reinforcing member 120 and the exterior material 110 are more preferably stuck and joined together, and thereby the tensile rigidity of the exterior panel 100 can be enhanced more by causing tension to act on the exterior material 110 during the deformation of the exterior material 110.

In particular, the first reinforcing member 122 is placed in the up and down direction along the direction of the curvature of the exterior material 110. Thereby, the tensile rigidity of a convex curved portion that is curved so as to protrude toward the outside of the automobile can be improved. Further, the exterior material 110 has a concave curved portion that is curved so as to protrude toward the inside as viewed from the outside of the automobile, and the reinforcing member 120 overlapping with the concave curved portion is stuck to the exterior material 110. The concave curved portion is inferior to the convex curved portion in tensile rigidity against a load from the outside of the automobile; thus, the tensile rigidity of the entire exterior panel can be improved effectively by placing the reinforcing member 120 such that it is stuck to the concave curved portion.

The reinforcing member 120 goes across (traverses) the exterior material 110. In the present embodiment, the second moment of area of the reinforcing member 120 is small, and the yield stress is high (the elastic deformation region is large). Hence, in order to improve tensile rigidity as the whole of the exterior panel 100, the reinforcing member 120 is preferably made as long as possible.

In the example shown in FIG. 5, a cross portion where the first reinforcing member 122 and the second reinforcing member 124 cross is provided. The second moment of area in a direction orthogonal to the longitudinal direction of the reinforcing member 120 extending from the cross portion is set to less than or equal to 15,000 mm$^4$. When there is a cross portion, the area of a region of the exterior material sandwiched by reinforcing members 120 extending from the cross portion is smaller than the area of the entire surface of the exterior panel, and the ratio of the sheet thickness to the area sandwiched by reinforcing members 120 is relatively increased; therefore, tensile rigidity can be improved more. Thus, tensile rigidity can be improved effectively by providing a cross portion.

Further, by providing two or more cross portions, the individual region sandwiched by adjacent reinforcing members 120 of the exterior material 110 is made still smaller, and the ratio of the sheet thickness to the area of the individual region is relatively increased; therefore, tensile rigidity can be further improved. Thus, tensile rigidity can be improved effectively.

In the cross portion, concave portions 122a and 124a are provided in the first and second reinforcing members 122 and 124, respectively, as described later; thereby, the thickness of each of the first reinforcing member 122 and the second reinforcing member 124 in the direction orthogonal to the exterior material 110 is reduced. Thereby, the first and second reinforcing members 122 and 124 and the exterior material 110 can be stuck and joined together also in a neighboring region including the cross portion, and tensile rigidity can be improved effectively.

Figure 17:
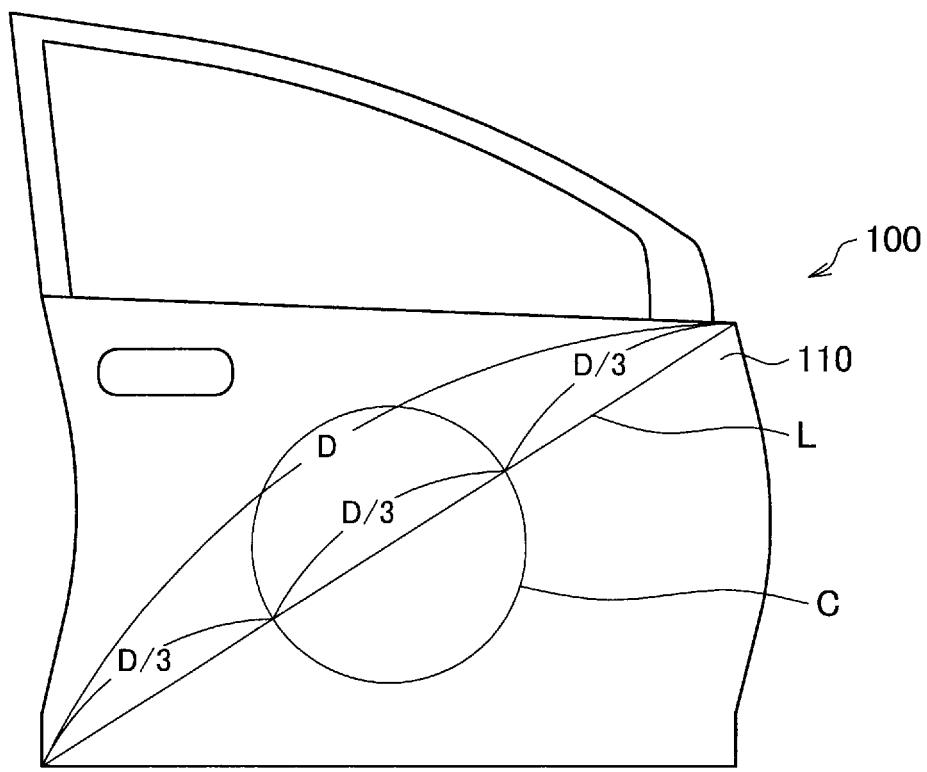
FIG. 17 is a schematic diagram showing arrangement positions when reinforcing members are arranged in order to ensure tensile rigidity in a case where a door panel of an automobile is used as an exterior panel.

Next, preferred arrangements of reinforcing members 120 for improving the tensile rigidity of the exterior material 110 are described. The periphery of the exterior material 110 has a relatively high tensile rigidity because another member is linked to the periphery or the periphery is supported by another member. On the other hand, a central portion of the exterior material 110 has a low tensile rigidity unless supported by another member. Therefore, it is mainly in a central portion of the exterior material 110 that the ensuring of tensile rigidity is important. FIG. 17 is a schematic diagram showing arrangement positions when reinforcing members 120 are arranged in order to ensure tensile rigidity in the case where a door panel of an automobile is used as the exterior panel 100 like in FIG. 3 to FIG. 7.

As shown in FIG. 17, an imaginary circle C through which reinforcing members 120 pass is set in the center of the exterior material 110 of the exterior panel 100. The imaginary circle C is a circle in which, among three line segments obtained by trisecting line segment L with a length of D shown in FIG. 17, the line segment located in the center is taken as the diameter (=D/3). Line segment L is the longest line segment among the line segments each obtained by connecting any two points that are set on the outline (the edge of the outer periphery) of the exterior material 110. In the case where the exterior panel 100 is a door panel, line segment L is a diagonal line connecting opposite angles of the door panel, as shown in FIG. 17.

After an imaginary circle C like the above is set, the reinforcing member 120 according to the present embodiment is placed so as to pass through the inside of the imaginary circle C. By placing the reinforcing member 120 such that it passes through the imaginary circle C, the reinforcing member 120 passes through the neighborhood of the center of the exterior material 110 whatever panel the exterior panel 100 is, such as a fender (the front portion or the rear portion), a hood, a door panel, a roof, or a trunk. Therefore, tensile rigidity can be enhanced in the neighborhood of the center of the exterior material 110.

Also in the case where a plurality of reinforcing members 120 are arranged, at least one reinforcing member 120 is placed so as to pass through the inside of the imaginary circle C. Further, by arranging two or more reinforcing members 120 such that they pass through the inside of the imaginary circle C, tensile rigidity in the neighborhood of the center of the exterior material 110 can be enhanced more.

Figure 18:
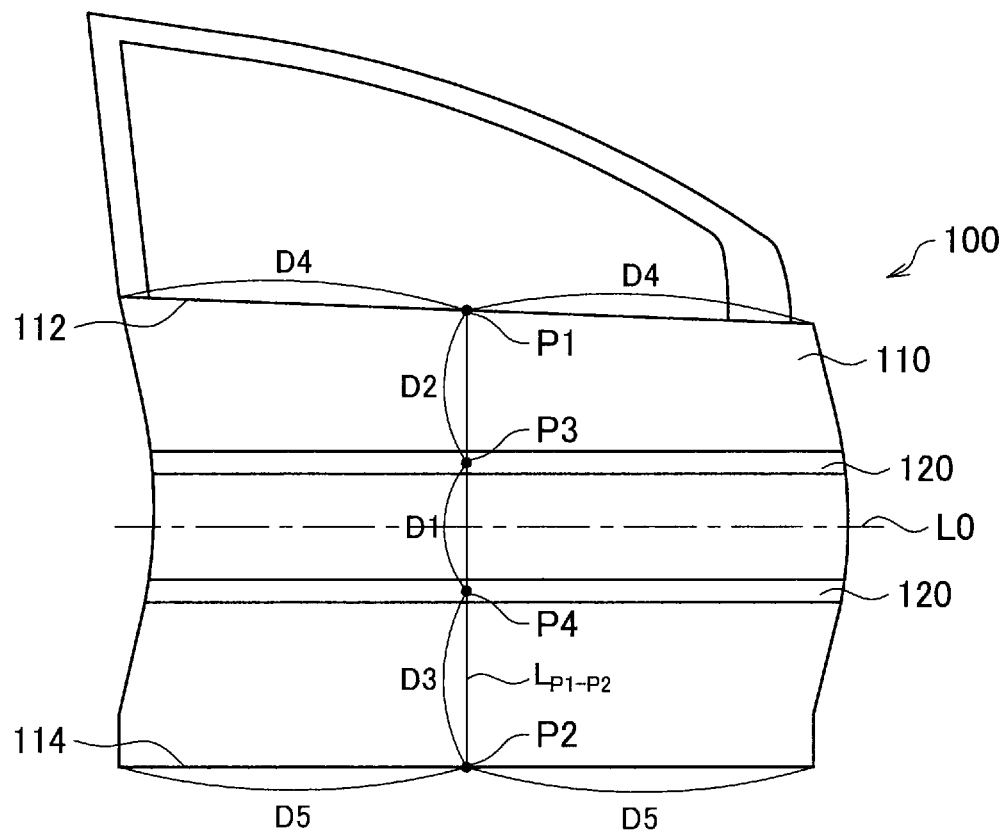
FIG. 18 is a schematic diagram showing another example of arrangement positions when reinforcing members are arranged in order to ensure tensile rigidity in a case where a door panel of an automobile is used as an exterior panel.

FIG. 18 is a schematic diagram showing another example of positions where reinforcing members 120 are arranged in order to ensure tensile rigidity in the case where a door panel of an automobile is used as the exterior panel 100.

In the example shown in FIG. 18, a plurality of reinforcing members 120 are arranged between two facing sides 112 and 114 of the exterior material 110. Although in FIG. 18 two reinforcing members 120 are arranged between two sides 112 and 114, three or more reinforcing members 120 may be arranged. Further, although in FIG. 18 the two facing sides 112 and 114 of the exterior material 110 are sides in the vehicle length direction of the door panel, they may be sides in the vehicle height direction. At least one reinforcing member 120 is placed more on the side 112 side than an intermediate line L0 located in the middle between side 112 and side 114. Further, at least one reinforcing member 120 is placed more on the side 114 side than the intermediate line L0. The direction in which each of the reinforcing members 120 extends is a direction along the nearer one of side 112 and side 114.

In the present embodiment, in the arrangement of reinforcing members 120 shown in FIG. 18, the distance D1 between adjacent two reinforcing members 120 is shorter than the distance D2 from side 112 to the nearest reinforcing member 120. Further, the distance D1 between adjacent two reinforcing members 120 is shorter than the distance D3 from side 114 to the nearest reinforcing member 120.

In general, the exterior panel 100 is linked to another member or supported by another member on the outline of the exterior panel 100. Hence, a region relatively near from the outline of the exterior material 110 is held by another member, and has a relatively high tensile rigidity. Therefore, the tensile rigidity of a region along side 112 can be ensured even when the distance D2 from side 112 to the nearest reinforcing member 120 is set relatively long. Similarly, the tensile rigidity of a region along side 114 can be ensured even when the distance D3 from side 114 to the nearest reinforcing member 120 is set relatively long.

On the other hand, the neighborhood of the intermediate line L0 in the center of the exterior material 110 is far from side 112 or side 114, and therefore the tensile rigidity in this portion is more likely to be reduced than in a region along side 112 or side 114. Thus, the distance D1 between adjacent two reinforcing members 120 is set shorter than the distance D2 from side 112 to the nearest reinforcing member 120, and thereby tensile rigidity can be enhanced in the neighborhood of the intermediate line L0 in the center of the exterior material 110. Similarly, the distance D1 between adjacent two reinforcing members 120 is set shorter than the distance D3 from side 114 to the nearest reinforcing member 120, and thereby tensile rigidity can be enhanced in the neighborhood of the intermediate line L0 in the center of the exterior material 110.

In FIG. 18, in the case where side 112 and side 114 are not parallel, it is envisaged that the values of distances D1, D2, and D3 are different in accordance with the measured positions. Hence, a line segment $L_{P1-P2}$ connecting the midpoint P1 of side 112 and the midpoint P2 of side 114 is set, and points P3 and P4 at which the line segment $L_{P1-P2}$ connecting P1 and P2 and reinforcing members 120 cross are found; D1 is defined as the distance between P3 and P4, D2 is defined as the distance between P1 and P3, and D3 is defined as the distance between P4 and P2.

Although FIG. 18 shows a case where reinforcing members 120 are arranged substantially parallel to side 112 and side 114, the reinforcing member 120 may not be parallel to side 112 or 114. In the present embodiment, the angle between a reinforcing member 120 near to side 112 and side 112 is within 30°. Further, the angle between a reinforcing member 120 near to side 114 and side 114 is within 30°. By thus setting the angle between a reinforcing member 120 and the side near to the reinforcing member 120 out of side 112 and side 114 within 30°, tensile rigidity in the vicinity of side 112 or side 114 can be enhanced.

Figure 19:
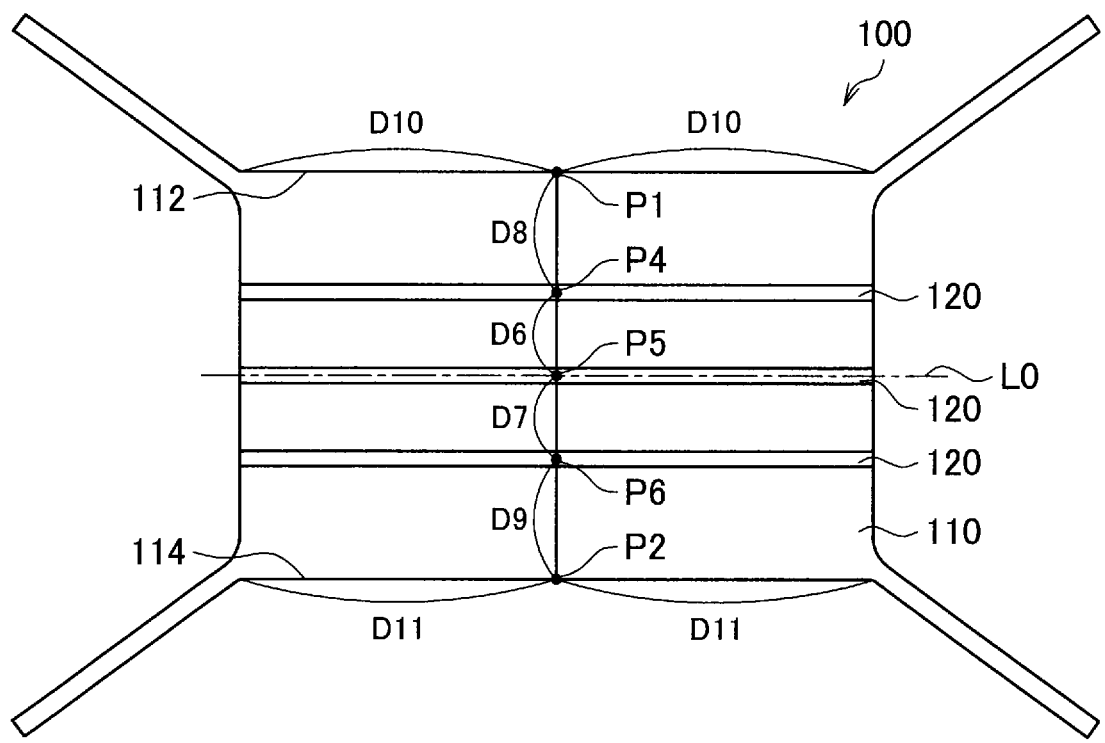
FIG. 19 is a schematic diagram showing arrangement positions when reinforcing members are arranged in order to ensure tensile rigidity in a case where a roof of an automobile is used as an exterior panel.

FIG. 19 is a schematic diagram showing arrangement positions when reinforcing members 120 are arranged in order to ensure tensile rigidity in the case where a roof of an automobile is used as the exterior panel 100. In the case of a panel placed on an upper surface of an automobile such as a roof, the vehicle height direction does not exist in the panel. The vehicle height direction of a panel placed on a side surface of an automobile such as a door panel (the up and down direction) corresponds to the vehicle width direction of a panel placed on an upper surface of an automobile such as a roof (the left and right direction). In the example shown in FIG. 19, like in FIG. 18, three reinforcing members 120 are arranged between two facing sides 112 and 114 of the exterior material 110. At least one reinforcing member 120 is placed more on the side 112 side than an intermediate line L0 located in the middle between side 112 and side 114. Further, at least one reinforcing member 120 is placed more on the side 114 side than the intermediate line L0. The direction in which each of the reinforcing members 120 extends is a direction along the nearer one of side 112 and side 114.

Like in FIG. 18, also in the arrangement of reinforcing members 120 shown in FIG. 19, each of the distances D6 and D7 between adjacent two reinforcing members 120 is shorter than the distance D8 from side 112 to the nearest reinforcing member 120. Further, each of the distances D6 and D7 between adjacent two reinforcing members 120 is shorter than the distance D9 from side 114 to the nearest reinforcing member 120.

Also in FIG. 19, a region relatively near from the outline of the exterior material 110 is held by another member that is linked to the outline or supports the outline, and has a relatively high tensile rigidity. Therefore, the tensile rigidity of a region along side 112 can be ensured even when the distance D8 from side 112 to the nearest reinforcing member 120 is set relatively long. Similarly, the tensile rigidity of a region along side 114 can be ensured even when the distance D9 from side 114 to the nearest reinforcing member 120 is set relatively long.

On the other hand, the neighborhood of the intermediate line L0 in the center of the exterior material 110 is far from side 112 or side 114, and therefore the tensile rigidity in this portion is more likely to be reduced than in a region along side 112 or side 114. Thus, each of the distances D6 and D7 between adjacent two reinforcing members 120 is set shorter than the distance D8 from side 112 to the nearest reinforcing member 120, and thereby tensile rigidity can be enhanced in the neighborhood of the intermediate line L0 in the center of the exterior material 110. Similarly, each of the distances D6 and D7 between adjacent two reinforcing members 120 is set shorter than the distance D9 from side 114 to the nearest reinforcing member 120, and thereby tensile rigidity can be enhanced in the neighborhood of the intermediate line L0 in the center of the exterior material 110.

Also in FIG. 19, a line segment $L_{P1\text{-}P2}$ connecting the midpoint P1 of side 112 and the midpoint P2 of side 114 is set, and points P4, P5, and P6 at which the line segment $L_{P1\text{-}P2}$ connecting P1 and P2 and reinforcing members 120 cross are found. Then, D6 is defined as the distance between P4 and P5, D7 is defined as the distance between P5 and P6, D8 is defined as the distance between P1 and P4, and D9 is defined as the distance between P6 and P2.

Also in FIG. 19, the angle between side 112 or 114 near to a reinforcing member 120 and the reinforcing member 120 is set within 30°, and thereby tensile rigidity in the vicinity of side 112 or side 114 can be enhanced.

Figure 13:
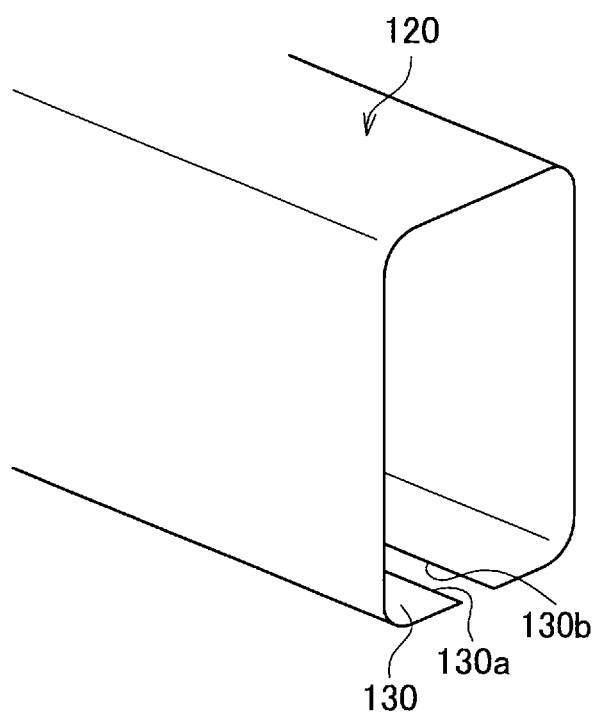
FIG. 13 is a schematic diagram showing a cross-sectional configuration in a direction orthogonal to a longitudinal direction of the first or second reinforcing member in the configuration of FIG. 9.

FIG. 13 is a schematic diagram showing a cross-sectional configuration in a direction orthogonal to the longitudinal direction of each of the first and second reinforcing members 122 and 124. As shown in FIG. 13, each of the first and second reinforcing members 122 and 124 has a cross-sectional shape of a rectangle, with a size of approximately 16 mm vertically and approximately 10 mm horizontally, as an example. Like in FIG. 8, each of the first and second reinforcing members 122 and 124 is formed by bending a sheet material 130, and end 130a and end 130b face each other. The first and second reinforcing members 122 and 124 may not necessarily have the same cross-sectional shape (that is, the same second moment of area); and one reinforcing member may have a cross-sectional shape of a rectangle like that shown in FIG. 13, and the other reinforcing member may have a cross-sectional shape of a square like that shown in FIG. 8, for example. Further, in the case where a plurality of first reinforcing members 122 and a plurality of second reinforcing members 124 are arranged, the first reinforcing members 122 may not necessarily have the same cross-sectional shape either; similarly, the second reinforcing members 124 may not necessarily have the same cross-sectional shape either. This is because the effect of improvement in the tensile rigidity of the exterior panel 100 and the effect of weight reduction can be obtained with better efficiency.

In the configuration shown in FIG. 13, the side of the short side of the cross-sectional shape of a rectangle is stuck to the exterior material 110. Thereby, a reinforcing member 120 having a cross-sectional shape with the best efficiency can be formed in order to ensure a desired second moment of area.

Figure 20:
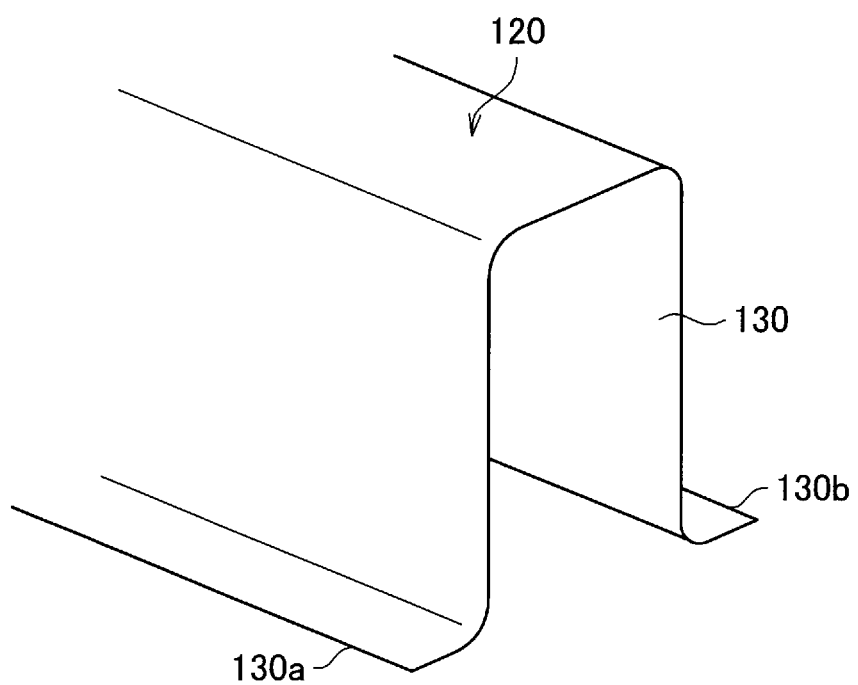
FIG. 20 is a schematic diagram showing an example in which each of ends of a sheet material is bent on an opposite side to a bending side of the configuration shown in FIG. 13.

FIG. 20 is a schematic diagram showing an example in which each of end 130a and end 130b of a sheet material 130 is bent on the opposite side to the bending side of the configuration shown in FIG. 13. The shape of FIG. 20 is referred to as a hat shape.

Also in the configuration shown in FIG. 20, the side of the short side of the cross-sectional shape of a rectangle is stuck to the exterior material 110. Thereby, a reinforcing member 120 having a cross-sectional shape with the best efficiency can be formed in order to ensure a desired second moment of area.

Figure 9:
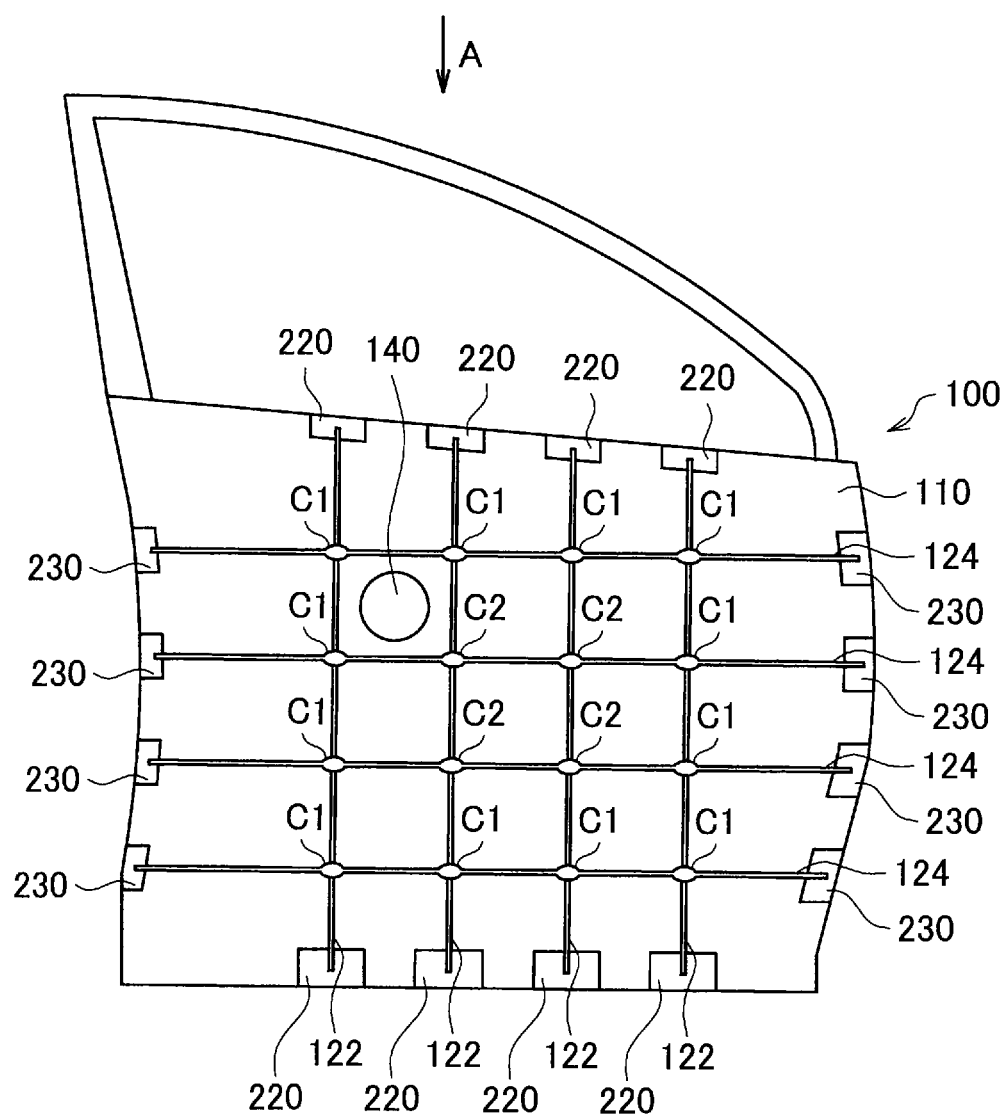
FIG. 9 is a schematic diagram showing an exterior panel (a door panel) in which first reinforcing members are arranged in an up and down direction of an exterior material and second reinforcing members are arranged in a front and rear direction of the exterior material 110.
Figure 10:
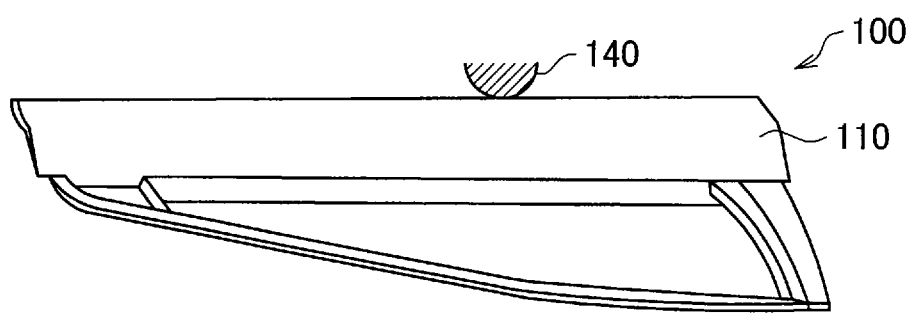
FIG. 10 is a schematic diagram showing a state viewed from a direction of arrow A of FIG. 9.
Figure 14:
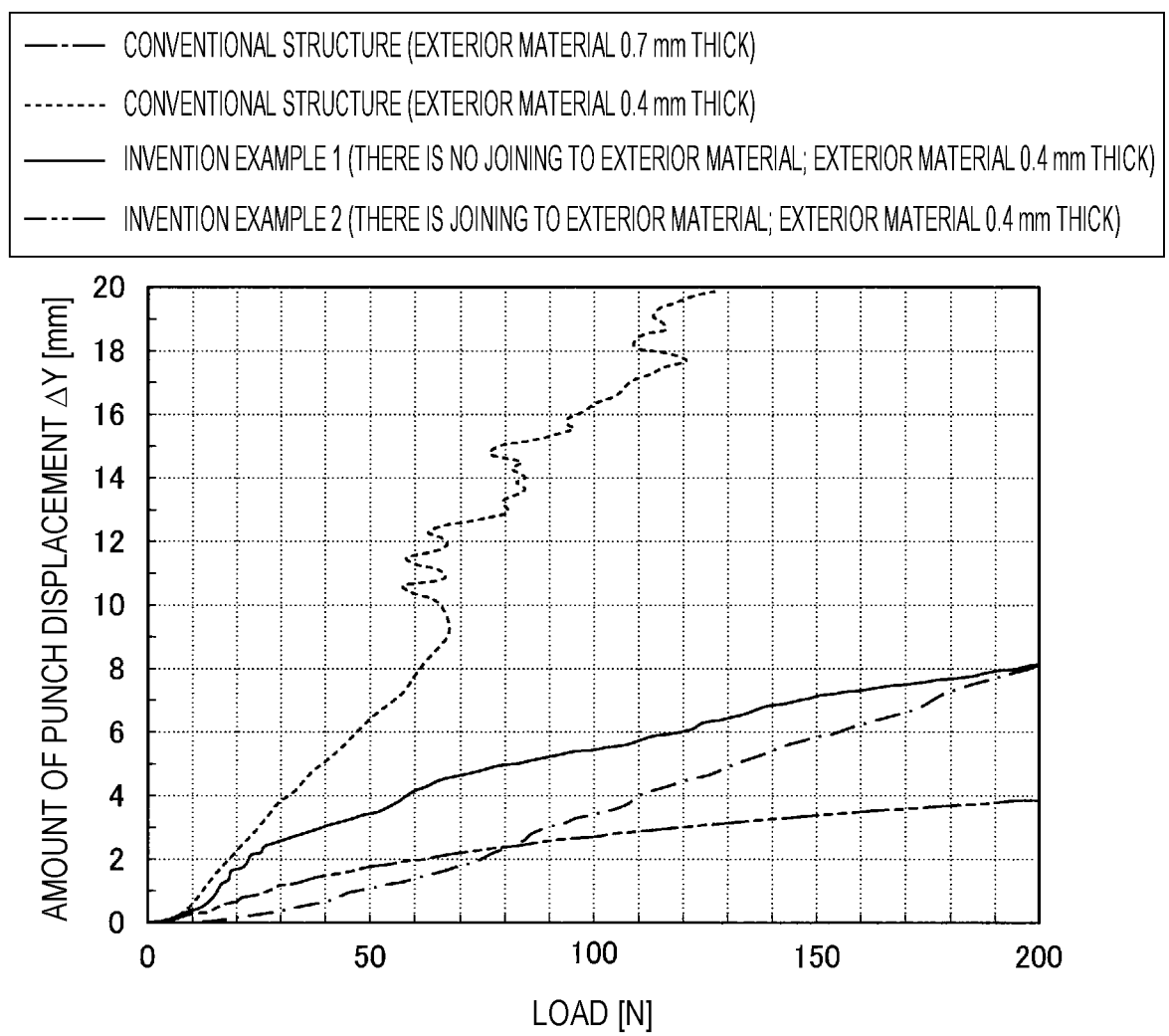
FIG. 14 is a characteristic diagram showing, in regard to FIG. 9 and FIG. 10, relationships between an application load of an indenter 140 and the amount of displacement, obtained by a simulation for evaluating tensile rigidity of an exterior panel.

FIG. 14 is a characteristic diagram showing, in the configuration example of FIG. 9 and FIG. 10, relationships between the application load of an indenter 140 and the amount of displacement, obtained by a simulation in order to evaluate tensile rigidity. FIG. 9 is a schematic diagram showing an exterior panel 100 (a door panel) in which first reinforcing members 122 are arranged in the up and down direction of the exterior material 110 and second reinforcing member 124 are arranged in the front and rear direction of the exterior material 110, and shows the configuration of FIG. 5 in detail. FIG. 10 is a schematic diagram showing a state viewed from the direction of arrow A of FIG. 9. FIG. 9 shows a state where the exterior panel 100 is viewed from the front side (from the outside of the automobile), and shows first reinforcing members 122 and second reinforcing members 124 in a state where the exterior material 110 is seen through. The indenter 140 shown in FIG. 9 is a member that presses the exterior panel 100 in the simulation shown in FIG. 14. The simulation result shown in FIG. 14 shows a case where the thickness of the exterior material 110 is 0.4 mm and neither the first reinforcing member 122 nor the second reinforcing member 124 is joined to the exterior material 110 (Invention Example 1, the characteristics shown by the solid line) and a case where the thickness of the exterior material 110 is 0.4 mm and the first reinforcing member 122 and the second reinforcing member 124 are joined to the exterior material 110 (Invention Example 2, the characteristics shown by the alternate long and two short dashes line). The simulation result shown in FIG. 14 shows, for comparison, also characteristics in a case where the thickness of the exterior material 110 is 0.7 mm and there is no reinforcing member (the alternate long and short dash line) and characteristics in a case where the thickness of the exterior material 110 is 0.4 mm and there is no reinforcing member (the broken line).

The thickness of a common automotive exterior panel in current use is approximately 0.7 mm, and is equivalent to the characteristics of the alternate long and short dash line. As shown in FIG. 14, Invention Example 2 (the alternate long and two short dashes line) in which the first reinforcing member 122 and the second reinforcing member 124 are joined to the exterior material 110 has obtained a result in which the amount of displacement with respect to the application load is equal to or more than that in the characteristics in the case where the thickness of the exterior material 110 is 0.7 mm and there is no reinforcing member (the alternate long and short dash line). In particular, in Invention Example 2, when the load is more than 80 [N], the amount of displacement with respect to the application load is lower than that in the characteristics of the alternate long and short dash line. Further, in the characteristics of Invention Example 1 (the solid line) in which neither the first reinforcing member 122 nor the second reinforcing member 124 was joined to the exterior material 110, the amount of displacement with respect to the application load was slightly larger than that in the characteristics of the alternate long and short dash line, but was equal to that in the characteristics of the alternate long and short dash line when the application load was approximately 200 [N]. Therefore, according to the present embodiment, a reduction in tensile rigidity can be prevented even when the thickness of the exterior material 110 is set to 0.4 mm, which is much thinner than at present. Thus, the thickness of the exterior material 110 can be reduced to, for example, approximately 0.4 mm, and the exterior panel 100 can be reduced in weight.

As shown by the characteristics of the broken line in FIG. 14, in the characteristics in the case where the thickness of the exterior material 110 is 0.4 mm and there is no reinforcing member, the amount of displacement with respect to the application load is much larger than those in the other characteristics. This shows that the exterior material 110 deforms largely when the exterior panel is pushed. Therefore, in the case where the thickness is 0.4 mm and there is no reinforcing member, the exterior material is difficult to use as an automotive exterior panel.

As described hereinabove, by the reinforcing member 120 of the present embodiment, the tensile rigidity of the exterior material 110 can be improved with reliability. Further, by the reinforcing member 120 of the present embodiment, also impact resistance properties at the time of a collision can be improved. In the following, improvement in collision resistance properties by the reinforcing member 120 of the present embodiment is described.

As described above, in the reinforcing member 120, the second moment of area in a direction orthogonal to the longitudinal direction is set to less than or equal to 15,000 mm$^4$, and is preferably set to less than or equal to 12,000 mm$^4$. The material quality, the sheet thickness, and the cross-sectional shape of the sheet material 130 of the reinforcing member 120 are set so as to satisfy this condition, as appropriate. When this condition is satisfied, there is a case where not only an effect regarding improvement in tensile rigidity like that described above but also an effect regarding improvement in collision resistance properties is obtained. That is, by satisfying the condition of the second moment of area described above, the plastic buckling limit of the reinforcing member 120 can be increased; hence, upon reception of the input of a collision load, plastic buckling is less likely to be caused; thus, reaction force based on elastic deformation can be utilized effectively for collision resistance properties. Reaction force based on elastic deformation provides a relatively large amount of increase in reaction force against deformation, and plastic deformation has a small amount of increase in reaction force against deformation. Therefore, reaction force based on elastic deformation can be utilized effectively as collision resistance properties. If the second moment of area is set large, even small bending is likely to cause plastic buckling. In a conventional structure, the second moment of area of a door impact bar 300 is set to approximately 18,000 mm$^4$, and it is assumed that collision resistance properties by plastic deformation are brought out. On the other hand, in the present embodiment, the upper limit value of the second moment of area is set as above; as a result, upon reception of the input of a collision load, the plastic buckling of the reinforcing member 120 is suppressed, and a collision resistance function can be brought out by elastic deformation.

Further, the yield stress of the reinforcing member 120 is set to more than or equal to 500 MPa. Thereby, the plastic buckling limit of the reinforcing member 120 can be increased, and reaction force based on elastic deformation can be utilized more effectively; thus, collision resistance properties can be improved effectively.

Further, even when the reinforcing member 120 is formed of a fine member, reinforcing members 120 serve as practical impact absorption members by crossing them. If the number of door impact bars 300 is only one like in a conventional structure, a hitting failure may occur depending on the position where a collision load is applied. If a plurality of door impact bars 300 are installed as a measure against hitting failure, a great weight increase is caused. According to the present embodiment, reinforcing members 120 having lighter weights than in the past can be arranged largely on the entire surface of the exterior panel 100, and therefore a hitting failure can be avoided while a weight increase is suppressed. Further, since the first and second reinforcing members 122 and 124 are connected together as the reinforcing members 120, a collision load applied to one reinforcing member propagates also through the other reinforcing member, and both members can absorb the impact together.

Further, in the case where the exterior material 110 and the reinforcing member 120 are joined together, the falling-in (rotation) of the reinforcing member 120 when the deformation of the reinforcing member 120 is large during collision deformation can be suppressed, and collision resistance properties can be further improved. Further, also a feature in which, during collision deformation, tension occurs in the exterior material in a region between adjacent reinforcing members 120 is effective. When the exterior material 110 is made thin, rigidity is lost, and the exterior material 110 becomes dented (warped) easily and is not useful for impact absorption; however, by joining the exterior material 110 and the reinforcing member 120 together to restrain the exterior material 110, when the reinforcing member 120 deforms, the exterior material 110 around the deformed place is pulled in the in-plane direction. Even though the exterior material 110 does not have rigidity in the thickness direction, it has tensile strength in the in-plane direction, and can therefore resist tensile deformation; thus, the properties of the impact absorption member can be improved.

From the foregoing, the exterior panel 100 according to the present embodiment can improve not only tensile rigidity but also collision resistance properties. Thus, the effect of further weight reduction can be obtained by the simplification or omission of conventional collision resistance components. In the case where conventional collision resistance components are used, the exterior panel 100 according to the present embodiment can contribute to further improvement in collision safety properties.

Further, by being placed in the up and down direction along the direction of the curvature of the exterior material 110, the first reinforcing member 122 can improve the collision resistance function of a convex curved portion that is curved so as to protrude toward the outside of the automobile.

Further, the reinforcing member 120 goes across (traverses) the exterior material 110. In the present embodiment, the second moment of area of the reinforcing member 120 is small, and the yield stress is high (the elastic deformation region is large). Hence, the load and the impact at the time of a collision of the exterior panel 100 are caught by the entire member; thus, the reinforcing member 120 is preferably made as long as possible. Further, by the reinforcing member 120 going across the exterior material 110, the setting flexibility of a support point with which the reinforcing member 120 that has received a collision load obtains reaction force (a contact point with another conventional component) can be enhanced. Further, by making the reinforcing member 120 as long as possible, the area where an impact is caught at the time of a collision can be enlarged, and collision resistance properties can be improved.

In the following, improvement in the collision resistance function of the exterior panel 100 by providing the reinforcing member 120 is described. FIG. 9 is a schematic diagram showing an exterior panel 100 (a door panel) in which arrangement is made such that, as described above, the longitudinal direction of the first reinforcing member 122 is the up and down direction of the exterior material 110 and the longitudinal direction of the second reinforcing member 124 is the horizontal direction of the exterior material 110, and shows the configuration of FIG. 5 in detail.

In FIG. 9, the first reinforcing member 122 is supported by support units 220 arranged at both ends in the up and down direction of the exterior panel 100. Further, the second reinforcing member 124 is supported by support units 230 arranged at both ends in the up and down direction of the exterior panel 100. More specifically, both ends of the first reinforcing member 122 are sandwiched and supported by the exterior material 110 and the support units 220. Similarly, both ends of the second reinforcing member 124 are sandwiched and supported by the exterior material 110 and the support units 230. In FIG. 9, the distance between a cross portion on the outside in the up and down direction of the vehicle or on the outside in the front and rear direction among the cross portions between the first reinforcing members 122 and the second reinforcing members 124 and a supported portion of the first reinforcing member 122 or the second reinforcing member 124 supported by the support unit 220 or the support unit 230 is within ⅓ of the length of the first reinforcing member 122 or the second reinforcing member 124, respectively. Thereby, when a load caused by a collision is applied to reinforcing members 120, the load caused by the collision can be caught by elastic deformation with good efficiency because, for example, the load applied to second reinforcing members 124 is applied to first reinforcing members 122 via cross portions and the distance from a cross portion to the supported portion of the first reinforcing member 122 supported by the support unit 220 is short.

FIG. 9 shows an example in which concave portions 122a and 124a are provided and crossed in a cross portion between the first reinforcing member 122 and the second reinforcing member 124 and thereby the first reinforcing member 122 and the second reinforcing member 124 are arranged in the same plane. In FIG. 9, first reinforcing members 122 and second reinforcing members 124 are arranged in an interknitted manner, and the vertical arrangement of the first reinforcing member 122 and the second reinforcing member 124 is made different between adjacent cross portions.

When the first and second reinforcing members 122 and 124 are arranged in an interknitted manner, the efficiency of load transfer between the first reinforcing member 122 and the second reinforcing member 124 is improved. Thereby, at the time of a collision, an impact absorption function can be ensured effectively by the first and second reinforcing members 122 and 124.

Figure 11:
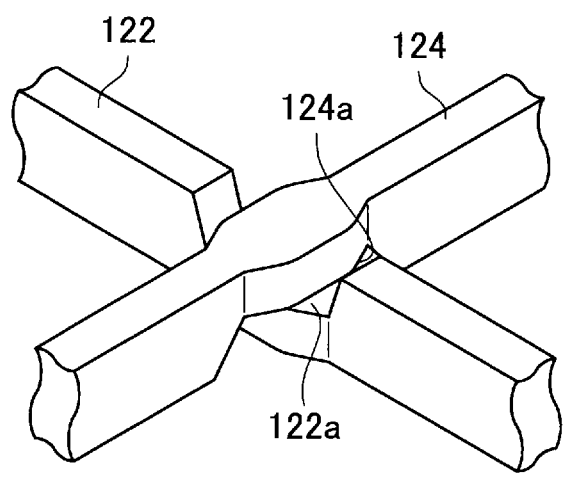
FIG. 11 is a perspective view showing a cross portion between a first reinforcing member and a second reinforcing member in FIG. 9 in detail.
Figure 12:
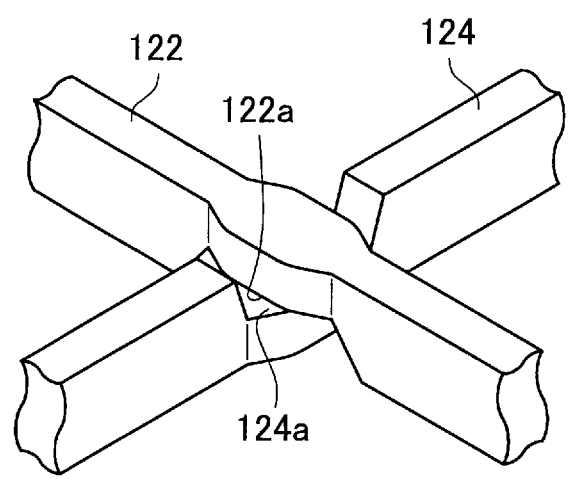
FIG. 12 is a perspective view showing a cross portion between a first reinforcing member and a second reinforcing member in FIG. 9 in detail.

FIG. 11 and FIG. 12 are perspective views showing cross portions between the first reinforcing member 122 and the second reinforcing member 124 in FIG. 9 in detail. FIG. 11 corresponds to cross portion C1 shown in FIG. 9, and FIG. 12 corresponds to cross portion C2 shown in FIG. 9. In cross portion C1, the second reinforcing member 124 is located more on the outside of the vehicle (on the exterior material 110 side) than the first reinforcing member 122. Thus, the first and second reinforcing members 122 and 124 can be arranged in an interknitted manner. By concave portion 122a being provided in the first reinforcing member 122 and concave portion 124a being provided in the second reinforcing member 124, the first reinforcing member 122 and the second reinforcing member 124 are arranged in the same plane. In cross portion C2, the first reinforcing member 122 is located more on the outside of the vehicle than the second reinforcing member 124. Also in cross portion C2, by concave portion 122a being provided in the first reinforcing member 122 and concave portion 124a being provided in the second reinforcing member 124, the first reinforcing member 122 and the second reinforcing member 124 are arranged in the same plane.

Although illustration is omitted, the first and second reinforcing members 122 and 124 do not necessarily need to be arranged in an interknitted manner; for a reason regarding fabrication at the time of fixing to the exterior panel 100 or the like, all first reinforcing members 122 may be arranged more on the exterior panel side than all second reinforcing members 124, or conversely all second reinforcing members 124 may be arranged more on the exterior panel side than all first reinforcing members 122.

As described above, the second moment of area in a direction orthogonal to the longitudinal direction of the reinforcing member 120 extending from a cross portion is less than or equal to 15,000 mm$^4$. By providing a cross portion, the distance between a support point of bending deformation that is given to the reinforcing member 120 at the time of the input of a collision load and the point of application can be shortened, and therefore the amount of increase in reaction force against deformation can be further increased. Thus, collision properties can be improved effectively by providing a cross portion.

Further, by providing two or more cross portions, the distance between a support point of bending deformation that is given to the reinforcing member 120 at the time of the input of a collision load and the point of application can be further shortened, and therefore the amount of increase in reaction force against deformation can be increased even more. Further, an impact load can be propagated through and caught by a plurality of other reinforcing members 120, and therefore still higher reaction force can be obtained. Thereby, collision properties are improved even more.

Further, by providing concave portions 122a and 124a in the first and second reinforcing members 122 and 124 in a cross portion, the thickness of each of the first reinforcing member 122 and the second reinforcing member 124 in the direction orthogonal to the exterior material 110 is reduced. Thereby, the first and second reinforcing members 122 and 124 and the exterior material 110 can be stuck and joined together also in a neighboring region including the cross portion, and collision properties are improved.

Further, by providing a cross portion, the first reinforcing member 122 and the second reinforcing member 124 are restrained to each other in the cross portion. Thereby, for example, in the case where the reinforcing member 120 has a cross section of a rectangle and the side of the short side is stuck to the exterior material 110, an event in which, upon reception of a collision, the reinforcing member 120 experiences falling-down and the side of the long side comes close to the exterior material 110 can be prevented. Further, by arranging first and second reinforcing members 122 and 124 in an interknitted manner, an event in which, upon reception of a collision, the reinforcing member 120 experiences falling-down and the side of the long side comes close to the exterior material 110 can be prevented. When the spacing between cross portions is shortened, the restraint of rotation prevention is made at a short spacing, and therefore the first and second reinforcing members 122 and 124 are less likely to fall down. Thereby, a reduction in the second moment of area due to the falling-down of the reinforcing member 120 can be prevented, and a reduction in collision resistance properties can be prevented.

The impact absorption member needs to be supported by something and catch an impact load so that the impact absorption member does not make rigid-body movement with respect to the direction of load input. Since a load is inputted from the exterior material 110, support units 220 and 230 that catch an impact load are provided on the opposite side of reinforcing members 120 from the exterior material 110. At this time, when the point of load input to the reinforcing member 120 (a cross portion) and the support unit 220 or 230 are nearer, higher reaction force can be obtained with smaller deformation. In the case where the exterior panel 100 is a door panel, a part in contact with a door inner panel, a front pillar, a center pillar, a side sill, or the like falls under the support unit 220 or 230. In the case of an exterior panel 100 other than a door, the exterior panel 100 may be supported by keeping support units 220 and 230 in contact with other body structure materials. For example, in the case of a panel of a roof, a part in contact with a roof side rail, a front roof rail, a rear roof rail, or the like corresponds to the support unit 220 or 230. The support units 220 and 230 may be brought into contact with these body structure materials via other support components additionally provided, and may be supported.

In the reinforcing member 120, the supported portion supported by the support unit 220 or 230 is an end portion of the reinforcing member 120. Thus, by supporting end portions of the reinforcing member 120, the entire reinforcing member 120 can be utilized for impact absorption. Further, by joining the supported portion to some other component than the exterior material, the supported portion can be restrained also in a direction other than the direction of load input; thus, collision properties can be improved, and contributions to the prevention of the falling-in of the reinforcing member 120 etc. can be made. The supported portion may be provided in a place other than an end portion of the reinforcing member 120.

Figure 15:
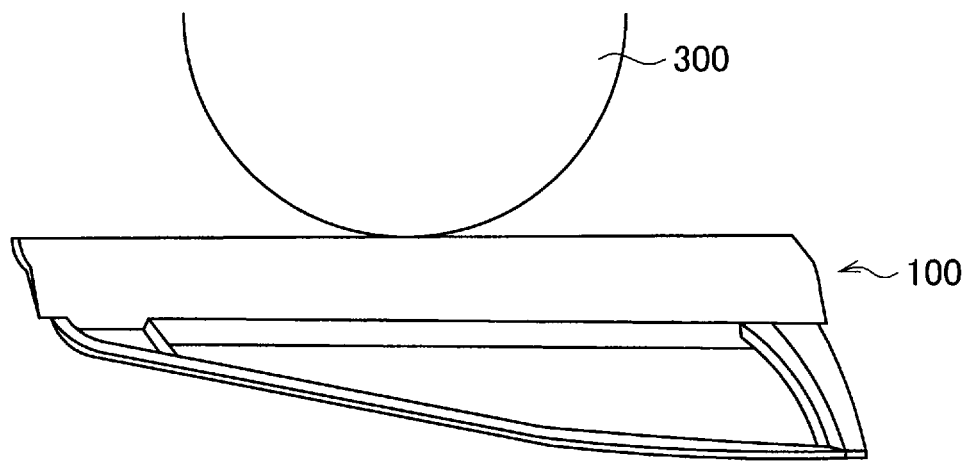
FIG. 15 is a schematic diagram showing a state where a collision of a side surface of an automobile (a side collision) is envisaged and an application load is applied to an exterior panel by a load application member.
Figure 16:
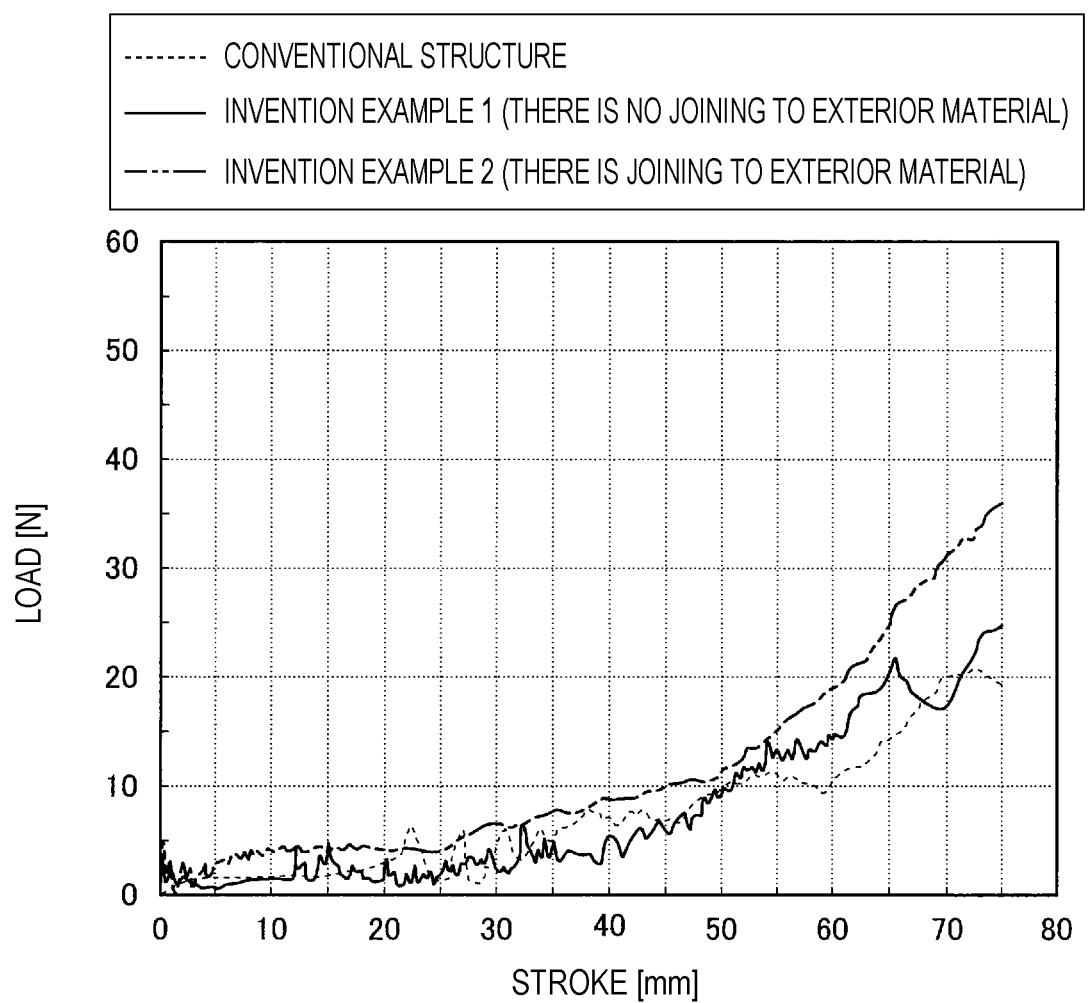
FIG. 16 is a characteristic diagram showing, in the configuration of FIG. 9, relationships between a stroke and a load when a load is applied by a load application member 300, obtained by a simulation for evaluating properties of a side surface collision of an exterior panel.

Next, the result of evaluation of the bending strength of the exterior panel 100 according to the present embodiment with consideration of the occasion of a collision is described on the basis of FIG. 15 and FIG. 16. FIG. 15 is a schematic diagram showing a state where, in the configuration of FIG. 9, a collision of a side surface of an automobile (a side collision) is envisaged and an application load is applied to the exterior panel 100 by a load application member 300.

FIG. 16 is a characteristic diagram showing, in the configuration of FIG. 9, relationships between the stroke and the load when a load is applied by the load application member 300. FIG. 16 shows a case where a load larger than the load of FIG. 14 is applied and a stroke equivalent to the occasion of a collision is made in order to evaluate the collision resistance function. In FIG. 16, the characteristics shown by the broken line show characteristics in a case where the conventional structure shown in FIG. 2 is evaluated under the same conditions for comparison. Further, the characteristics shown by the solid line correspond to Invention Example 1 in which neither the first reinforcing member 122 nor the second reinforcing member 124 is joined to the exterior material 110, and the characteristics shown by the alternate long and two short dashes line correspond to Invention Example 2 in which the first reinforcing member 122 and the second reinforcing member 124 are joined to the exterior material 110.

As shown in FIG. 16, in the configuration of Invention Example 1, the load is higher than the load in the conventional structure particularly when the stroke is more than or equal to 50 mm, and impact absorption properties higher than those of the conventional structure have been obtained. In the configuration of Invention Example 2, the load is higher than the load in the conventional structure in almost the entire region of the stroke, and impact absorption properties still higher than those of Invention Example 1 have been obtained. As described above, in the conventional structure, it is assumed that an impact resistance member such as a door impact bar 300 is caused to undergo plastic deformation; therefore, as the stroke becomes larger, plastic deformation becomes more likely to occur; thus, the rate of increase of the load due to the increase of the stroke is lower than in Invention Example 1 and Invention Example 2. On the other hand, in Invention Example 1 and Invention Example 2 according to the present embodiment, impact absorption is made in the range of elastic deformation, and therefore the rate of increase of the load due to the increase of the stroke is larger than in the conventional structure. Thus, by the configuration example of FIG. 9, sufficient impact absorption properties can be obtained even when, for example, a side collision of a pole in which a utility pole or the like collides with the door panel occurs.

The simulation result shows that, in the configuration of FIG. 9, plastic buckling did not occur even at strokes up to approximately 75 mm in both Invention Example 1 and Invention Example 2. Thus, according to the present embodiment, the impact of a collision can be absorbed by using the reinforcing member 120 as an elastic member. In Invention Example 1, the load has dropped temporarily at a stroke of approximately 65 mm; this is because part of the reinforcing member 120 experienced falling-down due to the fact that the reinforcing member 120 was not joined to the exterior material 110. However, such falling-down of the reinforcing member 120 can be suppressed by joining the reinforcing member 120 and the exterior material 110 together like in Invention Example 2, providing a cross portion in the reinforcing member 120 as described above, or arranging reinforcing members 120 in different directions in an interknitted manner.

The first reinforcing member 122 and the second reinforcing member 124 may not be separate members, and the first and second reinforcing members 122 and 124 may be formed as one body by, for example, processing one steel sheet into a press molded body in a lattice configuration having a thin cross section. In this case, a branched place serves as a cross portion.

The exterior material 110 and the reinforcing member 120 are not limited to a steel material, and may be formed of a nonferrous metal such as aluminum, or the like, for example. Further, for example, the exterior material 110 may be formed of a CFRP, and ribs corresponding to first and second reinforcing members 122 and 124 may be arranged on the back side of the exterior material 110. In this case, the ribs corresponding to the first and second reinforcing members 122 and 124 may be molded integrally. In this case, a branched place (a cruciform place) is regarded as a cross portion. Further, the ribs corresponding to the first and second reinforcing members 122 and 124 may be molded integrally with the exterior material 110; in this case, the ribs corresponding to the first and second reinforcing members 122 and 124 are regarded as being joined to the exterior material 110.

As described hereinabove, according to the present embodiment, reinforcing members 120 are arranged on and stuck to an exterior material 110 formed of an approximately 0.4-mm thin sheet, and thereby tensile rigidity can be enhanced significantly. Thus, the deformation of the exterior panel 100 can be prevented even when a user touches an exterior panel 100 formed of a thin sheet or a user pushes the exterior panel 100.

As necessary, a plurality of first reinforcing members 122 and a plurality of second reinforcing members 124 may be arranged in a lattice configuration and stuck to the exterior material 110, and a collision load may be caused to be absorbed principally by elastic deformation; thereby, collision resistance properties can be improved. Thus, an automotive exterior panel in which a weight reduction is achieved, tensile rigidity is improved, and collision resistance properties are excellent can be provided.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST

100 exterior panel
110 exterior material
120 reinforcing member
122 first reinforcing member
124 second reinforcing member

The invention claimed is:

1. An automotive exterior panel comprising:
an exterior material; and
a reinforcing member,
the reinforcing member being in contact along an automobile inside surface of the exterior material,
a cross section orthogonal to a longitudinal direction of the reinforcing member being rectangular shape,
a short side of the rectangular shape being stuck to the exterior material, a second moment of area in a direction orthogonal to the exterior material being less than or equal to 15,000 mm$^4$ in the cross section.

2. The automotive exterior panel according to claim 1, wherein a yield stress of the reinforcing member is more than or equal to 500 MPa.

3. The automotive exterior panel according to claim 1, wherein a cross portion is provided in the reinforcing member, and the second moment of area in the direction orthogonal to the exterior material is less than or equal to 15,000 mm$^4$ in the cross section orthogonal to the longitudinal direction of the reinforcing member extending from the cross portion.

4. The automotive exterior panel according to claim 3, wherein two or more cross portions are provided.

5. The automotive exterior panel according to claim 1, wherein the reinforcing member is stuck to the exterior material in a region of more than or equal to ⅓ of a total length of the reinforcing member.

6. The automotive exterior panel according to claim 1, wherein the exterior material has a concave curved portion that is curved concavely as viewed from an outside of an automobile, and the reinforcing member overlapping with the concave curved portion is stuck to the exterior material.

7. The automotive exterior panel according to claim 1, wherein the reinforcing member goes across the exterior material.

8. The automotive exterior panel according to claim 1, wherein the reinforcing member is joined to the exterior material.

9. The automotive exterior panel according to claim 1, wherein the reinforcing member passes through an inside of a circle in which, among three line segments obtained by trisecting a longest line segment among line segments each connecting any two points on an outline of the exterior material, a line segment located in a center is taken as a diameter.

10. The automotive exterior panel according to claim 1, wherein a plurality of the reinforcing members are arranged between a first side and a second side of the exterior material that face each other, at least one of the reinforcing members is placed more on a side of the first side than an intermediate line between the first side and the second side, at least one of the reinforcing members is placed more on a side of the second side than the intermediate line, an extending direction of each of the reinforcing members is a direction along a nearer one of the first side and the second side, and a first distance between adjacent two of the reinforcing members is shorter than a second distance from the first side or the second side to a nearest one of the reinforcing members.

11. The automotive exterior panel according to claim 10, wherein an angle between the reinforcing member and one side near to the reinforcing member out of the first side and the second side is within 30°.

12. The automotive exterior panel according to claim 10, wherein the first distance is a distance between two points at which adjacent two of the reinforcing members and a line segment connecting a midpoint of the first side and a midpoint of the second side cross.

13. The automotive exterior panel according to claim 12, wherein the second distance is a distance between the midpoint of the first side and a point at which the reinforcing member nearest to the first side and the line segment connecting the midpoint of the first side and the midpoint of the second side cross.

14. The automotive exterior panel according to claim 12, wherein the second distance is a distance between the midpoint of the second side and a point at which the reinforcing member nearest to the second side and the line segment connecting the midpoint of the first side and the midpoint of the second side cross.

15. An automotive exterior panel comprising:
an exterior material; and
two reinforcing members,
the reinforcing members being in contact along an automobile inside surface of the exterior material,
a cross section orthogonal to a longitudinal direction of the reinforcing member being rectangular shape,
a short side of the rectangular shape being stuck to the exterior material,
a second moment of area in a direction orthogonal to the exterior material being less than or equal to 15,000 $mm^4$ in a cross section orthogonal to a longitudinal direction of the reinforcing member,
the two reinforcing members being crossed to form a cross portion,
thickness of each of the two reinforcing members in the direction orthogonal to the exterior material decreasing in the cross portion.

* * * * *